US010200085B1

(12) United States Patent
Gines et al.

(10) Patent No.: US 10,200,085 B1
(45) Date of Patent: *Feb. 5, 2019

(54) SYSTEM AND METHOD OF ANALYZING CROSSTALK INDUCED JITTER

(71) Applicant: Keysight Technologies, Inc., Minneapolis, MN (US)

(72) Inventors: David L. Gines, Fort Collins, CO (US); Steven Draving, Colorado, CO (US)

(73) Assignee: Keysight Technologies, Inc., Santa Rosa, CA (US)

(*) Notice: Subject to any disclaimer, the term of this patent is extended or adjusted under 35 U.S.C. 154(b) by 82 days.

This patent is subject to a terminal disclaimer.

(21) Appl. No.: 15/159,786

(22) Filed: May 19, 2016

(51) Int. Cl.
*H04B 3/487* (2015.01)
*H04L 12/26* (2006.01)
*H04B 3/32* (2006.01)

(52) U.S. Cl.
CPC .......... *H04B 3/487* (2015.01); *H04B 3/32* (2013.01); *H04L 43/087* (2013.01)

(58) Field of Classification Search
CPC .......... H04B 3/487; H04B 3/32; H04L 43/087
See application file for complete search history.

(56) References Cited

U.S. PATENT DOCUMENTS

| 6,128,769 | A | 10/2000 | Carlson et al. |
| 7,194,379 | B1 | 3/2007 | Chivers |
| 7,388,937 | B1 * | 6/2008 | Rodger ................ H04L 1/205 375/346 |
| 2005/0030884 | A1 | 2/2005 | Kim et al. |
| 2005/0053229 | A1 | 3/2005 | Tsatsanis et al. |
| 2005/0163207 | A1 | 7/2005 | Buckwalter et al. |
| 2006/0039551 | A1 * | 2/2006 | Hossain .............. H01L 23/5222 379/417 |
| 2006/0195805 | A1 * | 8/2006 | Matsumiya ......... G06F 17/5031 716/113 |
| 2007/0064923 | A1 * | 3/2007 | Schmukler ........... H03H 11/265 379/406.1 |
| 2008/0024331 | A1 | 1/2008 | Jang |

(Continued)

OTHER PUBLICATIONS

Co-pending U.S. Appl. No. 15/169,189, filed May 31, 2016.
(Continued)

*Primary Examiner* — Jeffrey M Rutkowski
*Assistant Examiner* — Chae S Lee (57) ABSTRACT

A measurement instrument and associated method: receive at a first input an aggressor signal (e.g., a supply voltage) from a device under test (DUT); capture samples of the aggressor signal; receive at a second input a victim signal from the DUT, wherein the received victim signal includes jitter induced thereon from the aggressor signal; capture samples of the received victim signal; apply the captured samples of the aggressor signal and the captured samples of the received victim signal to a predetermined model, which represents the jitter induced onto the received victim signal from the aggressor signal, to produce a system of equations; ascertain a plurality of unknown parameters in the predetermined model from the system of equations; and apply the predetermined model with the ascertained parameters to the captured samples of the aggressor signal to estimate the jitter induced onto the received victim signal from the aggressor signal.

13 Claims, 5 Drawing Sheets

(56) References Cited

U.S. PATENT DOCUMENTS

| | | |
|---|---|---|
| 2011/0235759 A1* | 9/2011 | Pierrugues ............... H04B 3/32 375/346 |
| 2014/0098908 A1 | 4/2014 | Rangachari et al. |
| 2015/0162952 A1 | 6/2015 | Hollis |
| 2016/0277068 A1 | 9/2016 | Heinikoski et al. |

OTHER PUBLICATIONS

Co-pending U.S. Appl. No. 15/183,772, filed Jun. 15, 2016.
Office Action dated Jul. 25, 2017 in co-pending U.S. Appl. No. 15/169,189, 20 pages.
Notice of Allowance dated Feb. 22, 2017 in co-pending U.S. Appl. No. 15/183,772, 18 pages.
Office Action dated Jan. 10, 2017 for U.S. Appl. No. 15/169,189.
Final Office Action dated Jan. 5, 2018 in co-pending U.S. Appl. No. 15/ 169,189, 9 pages.
Notice of Allowance dated Mar. 3, 2018, U.S. Appl. No. 15/169,189, 10 pages.

* cited by examiner

SYSTEM AND METHOD OF ANALYZING CROSSTALK INDUCED JITTER

BACKGROUND

In many systems and devices, especially, for example, devices and systems which include high speed digital communication circuits, crosstalk interference between various electrical signals can be a significant problem—and a difficult one to understand and diagnose. Commonly, crosstalk interference may be produced by two parallel signal lines radiating energy onto each other. In general, herein we refer to the signal which generates the crosstalk interference as an "aggressor signal" (also known as an "interfering signal") and the signal which experiences the crosstalk interference as a "victim signal." Of course when two signals produce mutual crosstalk interference, each signal may be both an aggressor signal in one case, and a victim signal in the other case.

Power supplies can also create crosstalk interference to signals. In many cases, power supply crosstalk interference onto signals can be just as important or more important to understand and diagnose as crosstalk interference between two signal lines. One reason for this is that different mechanisms and affects may pertain to power supply crosstalk as compared to crosstalk interference between two signal lines. For example, in general crosstalk interference between signal lines adds a voltage error to the original victim signal. However, in contrast, power supply crosstalk may not only add a voltage error to the victim, it may also amplitude modulate and phase modulate the victim signal. It should be noted that some aggressor signals other than a supply voltage may produce time or phase modulation of a victim signal (e.g., simple linear crosstalk between two signals after propagating through a subsequent voltage limiting buffer amplifier). Adding voltage error and/or phase modulation can affect the timing of edges or bit transitions in the victim signal's waveform, resulting in jitter. When the aggressor signal is a supply voltage, this may be referred to as power supply induced jitter (PSIJ). However, the phase modulation mechanism is particularly difficult to analyze because it is a time-variant process that does not lend itself to other linear stationary analysis techniques. Phase-modulated PSIJ may occur, for example, when a power supply provides a supply voltage to an oscillator (e.g., voltage controlled oscillator (VCO) and/or a phase-locked loop (PLL) which is used to generate a clock signal for a circuit, which in turn is used to determine the timing of the edges or bit transitions of a victim signal. In that case, power supply noise on the supply voltage may produce jitter in the clock signal, which in turn may produce PSIJ in the victim signal.

The analysis and diagnosis of crosstalk induced jitter such as PSIJ in a given device may be difficult and complicated.

For example, circuit simulation may be employed to analyze and diagnose PSIJ for one or more signal lines of a particular device. Given a circuit model of the particular device, software simulation tools may be employed to estimate the amount of PSIJ for a given signal line.

However, such circuit simulation has drawbacks. For one thing, the simulation results will only be as good as the circuit model. Producing accurate circuit models can be difficult and time-consuming as many circuits are complicated and have a large number of components. And if an accurate circuit model is produced, every time that a change is made to the device which is being analyzed, the circuit model must be updated. Furthermore, running the simulations can also require a lot of effort and can be time consuming. Moreover, it can be very difficult to produce an accurate simulation since in many cases the PSIJ may be created or affected by non-linearities and parasitic impedances in the circuit, which—unlike nominal circuit values—are typically not known in advance and may be difficult to ascertain. Finally, because of this, PSIJ performance may vary significantly from individual device to individual device even when the devices are designed to be identical. So accuracy of PSIJ estimates produced from circuit modeling and simulation is an issue.

One improvement for analyzing and diagnosing PSIJ for a device is to use actual measurements of a sample of the device to construct a circuit model, rather than constructing the circuit model from circuit diagrams or schematics. For example, to construct the circuit model one may disconnect the power supply from the rest of the device under test and replace it with an external supply which can be controlled to artificially generate a range of disturbance(s), and then measure the corresponding effect on the signal line(s) of interest as a function of the disturbance(s) across an expected range of interest. While this approach may potentially yield more accurate results, it can be tedious, invasive, time consuming, and require a lot of very expensive equipment.

It would be desirable to provide another technique for analyzing and diagnosing crosstalk induced jitter in a device under test.

SUMMARY

A method comprises: a measurement instrument receiving at a first input thereof an aggressor signal from a device under test (DUT); the measurement instrument capturing samples of the received aggressor signal; the measurement instrument receiving at a second input thereof a victim signal from the DUT, wherein the received victim signal includes jitter induced thereon from the aggressor signal; capturing samples of the received victim signal; applying the captured samples of the received aggressor signal and the captured samples of the received victim signal to a predetermined model, which represents the jitter induced onto the received victim signal from the aggressor signal, to produce a system of equations; and ascertaining a plurality of unknown parameters in the predetermined model from the system of equations.

In some embodiments, the method further comprises applying the predetermined model with the ascertained parameters to the captured samples of the received supply voltage to estimate the jitter induced onto the received victim signal from the supply voltage.

In some versions of these embodiments, the method further comprises: removing from the received victim signal the estimated jitter induced thereon from the aggressor signal; and displaying on a display device the received victim signal with the estimated jitter removed.

In some embodiments, the method further comprises: recovering a clock for the received victim signal from the captured samples of the received victim signal; and ascertaining time interval error (TIE) data for the received victim signal from the captured samples of the received victim signal and from the recovered clock, where the TIE data represents for each of a plurality of bit transitions in the received victim signal a difference between: (1) a time when the bit transition is observed in the received victim signal from the captured samples of the received victim signal, and (2) a time of an associated edge of the recovered clock, wherein the predetermined model is a model of TIE data for the victim signal as a function of: (1) intersymbol interference (ISI) in the received victim signal, and (2) the jitter induced onto the received victim signal from the aggressor signal.

In some versions of these embodiments, the model of TIE data for the victim signal includes a sum of: (1) an ISI filter function applied to the bit transitions in the received victim signal; (2) a crosstalk filter function applied to the captured samples of the aggressor signal; and (3) a constant.

In some versions of these embodiments, the model of TIE data is represented by: $T_v^e = h_v * E_v + h_a * M_A^e + k$, where: $h_v$ is the ISI filter function; $h_a$ is the crosstalk filter function; $E_v$ is a vector which represents the bit transitions in the received victim signal; $T_v^e$ and $M_A^e$ are interpolated versions of the TIE data, and the captured samples of the aggressor signal, respectively, onto an equally spaced grid of one sample per bit; and k is a constant In some versions of these embodiments, the unknown parameters include coefficients in the ISI filter function and in the crosstalk filter function.

In some versions of these embodiments, ascertaining the plurality of unknown parameters in the predetermined model from the system of equations includes: ascertaining the coefficients of the ISI filter function; and after ascertaining the coefficients of the ISI filter function, subsequently ascertaining the coefficients of the crosstalk filter function by applying the captured samples of the aggressor signal and the received victim signal to the predetermined model using the ascertained coefficients of the ISI filter function.

In some versions of these embodiments, ascertaining the coefficients of the ISI filter function includes: causing the victim signal to comprise a repeating data pattern such that the captured samples of the received victim signal include a plurality of instances of the data pattern; ascertaining, from the bit transitions in the received victim signal for the plurality of instances of the data pattern, an average vector of average TIE values over the plurality of instances of the data pattern for each bit transition in the data pattern; and ascertaining from the average vector and the bit transitions in the repeating data pattern the coefficients of the ISI filter function.

In some versions of these embodiments, ascertaining the coefficients of the ISI filter function includes solving a set of linear equations wherein the TIE data is set equal to a convolution of the ISI filter function and the bit transitions in the received victim signal.

In some embodiments, the aggressor signal is a supply voltage of the DUT.

In some versions of these embodiments, ascertaining the coefficients of the crosstalk filter function by applying the captured samples of the aggressor signal and the received victim signal to the predetermined model using the ascertained coefficients of the ISI filter function includes: subtracting from the TIE data an ISI component comprising a convolution of the ISI filter function and the bit transitions in the received victim signal; and solving a linear system of equations of a form $T_a^e = h_a * M_A^e$, to determine $\hat{h}_a$, where $\hat{h}_a$ is an estimated crosstalk filter function, and where $T_a^e$ and $M_A^e$ are, respectively, interpolated versions of: a component of TIE data due to the jitter induced onto the received victim signal from the aggressor signal to the received victim signal, and the captured samples of the aggressor signal, onto an equally spaced grid of one sample per bit.

In some versions of these embodiments, the method further comprises estimating the jitter induced onto the received victim signal from the aggressor signal includes convolving the crosstalk filter function with the captured samples of the aggressor signal.

In some versions of these embodiments, the method further comprises: estimating the jitter induced onto the received victim signal from the aggressor signal; removing from the received victim signal the estimated jitter induced thereon from the aggressor signal; and displaying on a display device the received victim signal with the estimated jitter removed, wherein removing from the received victim signal the estimated jitter includes: upsampling $T_x^e$ to a sample rate at which the measurement instrument captures the samples of the received victim signal, producing upsampled jitter error $T_x^u$, where $T_x^e = \hat{h}_a * M_a^e$; correcting a time base of the captured samples of the received victim signal to remove the upsampled jitter error $T_x^u$; and interpolating the time-base corrected captured samples of the received victim signal to produce time-base corrected captured samples at an original sample rate of the captured samples of the received victim signal.

In some embodiments the method further comprises eliminating a skew between the captured samples of the aggressor signal and the captured samples of the received victim signal before applying the captured samples of the aggressor signal and the captured samples of the received victim signal to the predetermined model.

A measurement instrument comprises: a first input configured to receive from a device under test (DUT) an aggressor signal; a first sampler configured to capture samples of the received aggressor signal; a second input configured to receive from the DUT a victim signal, wherein the received victim signal includes jitter induced thereon from the aggressor signal; a second sampler configured to capture samples of the received victim signal; and a signal processor configured to: apply the captured samples of the received aggressor signal and the captured samples of the received victim signal to a predetermined model, which represents the jitter induced onto the received victim signal from the aggressor signal, to produce a system of equations; and ascertain a plurality of unknown parameters in the predetermined model from the system of equations.

In some embodiments, the signal processor is further configured to apply the predetermined model with the ascertained parameters to the captured samples of the aggressor signal to estimate the jitter induced onto the received victim signal from the aggressor signal.

In some versions of these embodiments, the measurement instrument further comprises a display device, wherein the signal processor is further configured to remove from the received victim signal the estimated jitter induced thereon from the aggressor signal, to display via the display device the received victim signal with the estimated jitter removed.

In some embodiments, the measurement instrument is configured: to process the received victim signal to recover a clock for the received victim signal from the captured samples of the received victim signal; and to ascertain time interval error (TIE) data for the received victim signal from the captured samples of the received victim signal and from the recovered clock, where the TIE data represents for each bit transition in the received victim signal a difference between: (1) a time when the measurement instrument observes the bit transition occurring in the captured samples of the received victim signal, and (2) a time of an associated edge of the recovered clock, wherein the predetermined model is a model of TIE data for the received victim signal as a function of: (1) intersymbol interference (ISI) in the received victim signal, and (2) the jitter induced onto the received victim signal from the aggressor signal.

In some versions of these embodiments, the model of TIE data for the received victim signal includes a sum of: (1) an ISI filter function applied to the bit transitions in the received victim signal; (2) a crosstalk filter function applied to the captured samples of the aggressor signal; and (3) a constant.

In some versions of these embodiments, the unknown parameters include coefficients in the ISI filter function and in the crosstalk filter function, and the signal processor is configured to ascertain the plurality of unknown parameters in the predetermined model from the system of equations by: first ascertaining the coefficients of the ISI filter function; and then ascertaining the coefficients of the crosstalk filter function by applying the captured samples of the aggressor signal and the received victim signal to the predetermined model using the ascertained coefficients of the ISI filter function.

In some versions of these embodiments, the victim signal comprises a repeating data pattern such that the captured samples of the received victim signal include a plurality of instances of the data pattern, and the signal processor is configured to ascertain the coefficients of the ISI filter function by: ascertaining, from the bit transitions in the received victim signal for the plurality of instances of the data pattern, an average vector of average TIE values for each bit transition in the data pattern; and ascertaining from the average vector and the bit transitions in the repeating data pattern the coefficients of the ISI filter function.

In some versions of these embodiments, the signal processor is configured to ascertain the coefficients of the ISI filter function by solving a set of linear equations wherein the TIE data is set equal to a convolution of the ISI filter function and the bit transitions in the received victim signal.

BRIEF DESCRIPTION OF THE DRAWINGS

The example embodiments are best understood from the following detailed description when read with the accompanying drawing figures. Wherever applicable and practical, like reference numerals refer to like elements.

DETAILED DESCRIPTION

In the following detailed description, for purposes of explanation and not limitation, example embodiments disclosing specific details are set forth in order to provide a thorough understanding of an embodiment according to the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparati and methods may be omitted so as to not obscure the description of the example embodiments. Such methods and apparati are clearly within the scope of the present teachings.

Unless otherwise noted, when a first device is said to be connected to a second device, this encompasses cases where one or more intermediate devices may be employed to connect the two devices to each other. However, when a first device is said to be directly connected to a second device, this encompasses only cases where the two devices are connected to each other without any intermediate or intervening devices. Similarly, when a signal is said to be coupled to a device, this encompasses cases where one or more intermediate devices may be employed to couple the signal to the device. However, when a signal is said to be directly coupled to a device, this encompasses only cases where the signal is directly coupled to the device without any intermediate or intervening devices.

As mentioned previously, it would be desirable to provide additional techniques for analyzing and diagnosing crosstalk induced jitter in a device under test. In the description to follow concrete embodiments of such techniques, and systems (e.g., measurement instruments) for applying such techniques, are described in a context where the aggressor signal is a supply voltage and the jitter is power supplied induced jitter (PSIJ). However it should be understood that in general these techniques may be applicable to any crosstalk mechanism that results in the time or phase modulation of the victim signal.

Figure 1:
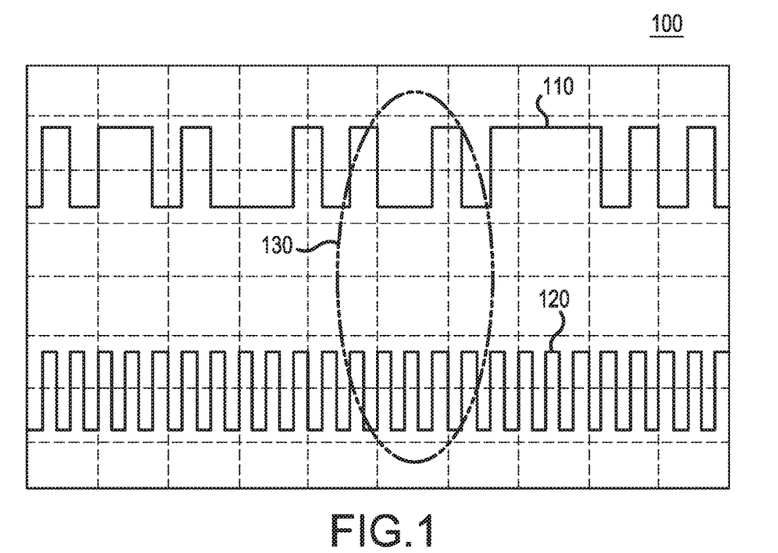
FIG. 1 illustrates a display of an example of a signal waveform and a clock waveform for the signal waveform.

FIG. 1 illustrates a display 100 of an example of a signal waveform 110 and a clock waveform 120 for signal waveform 110. In some embodiments, signal waveform 110 may be produced from digitized samples of a victim signal of a circuit of a device under test which are captured by a measurement instrument (e.g., a digital oscilloscope), for example via a signal probe. In some embodiments, clock waveform 120 may represent a clock recovered by the measurement device from the captured samples of the victim signal which is represented by signal waveform 110. In that case, clock waveform 120 may approximate or represent the waveform of an ideal clock synchronized to signal waveform 110.

Display 100 may be provided on a display device of the measurement instrument which captured the digitized samples of the victim signal for signal waveform 110. Alternatively, when the digitized samples for signal waveform 110 are stored in memory, display 100 may be provided "off-line" by any computer, tablet, or other device which has a microprocessor, a display device, and access to the stored digitized samples for signal waveform 110.

Figure 2:
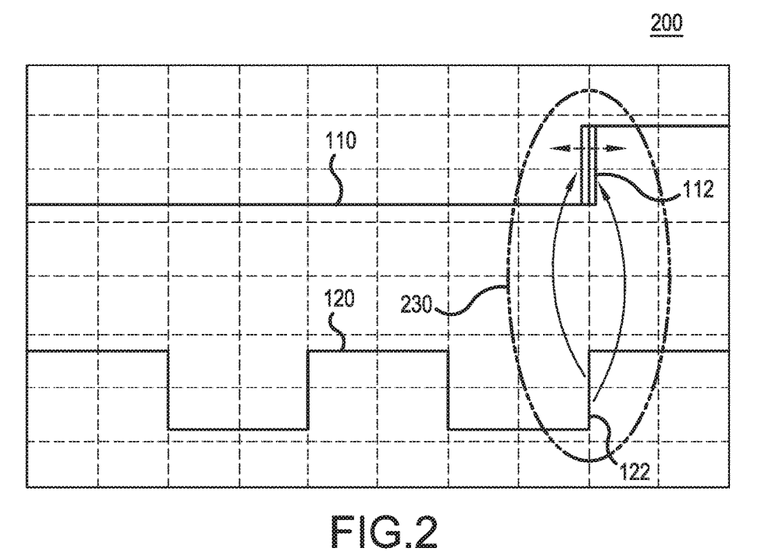
FIG. 2 illustrates a higher time-resolution display of a portion of the signal waveform and the clock waveform of FIG. 1, showing power supply induced jitter (JSIJ) on the signal waveform.

FIG. 2 illustrates a higher time-resolution display 200 of a portion of signal waveform 110 and clock waveform 120. In particular, FIG. 2 illustrates a portion 130 of display 100, clearly showing jitter, for example power supply induced jitter (JSIJ), on signal waveform 110.

In the example illustrated in FIG. 2, signal waveform 110 includes an edge or bit transition 112 (e.g., a rising edge or positive bit transition 112) which ideally should be synchronized to a rising edge 122 of clock waveform 120. However, as shown in FIG. 2, displayed signal waveform 110 exhibits a variance the timing of bit transition 112 due to the jitter on signal waveform 110. FIG. 2 can perhaps best be understood in the context of the signal waveform 110 having a repetitive pattern (e.g., a pseudorandom signal), where displays 100 and 200 show many copies of the pattern, synchronized to clock waveform 120, on top of each other. In that case, ideally all of the copies of the repetitive pattern should be displayed exactly on top of each other. However, when the victim signal experiences jitter (e.g., PSIJ), then the timing of bit transition 112 varies from one pattern to another, producing the variance in timing shown in display 200.

Figure 3:
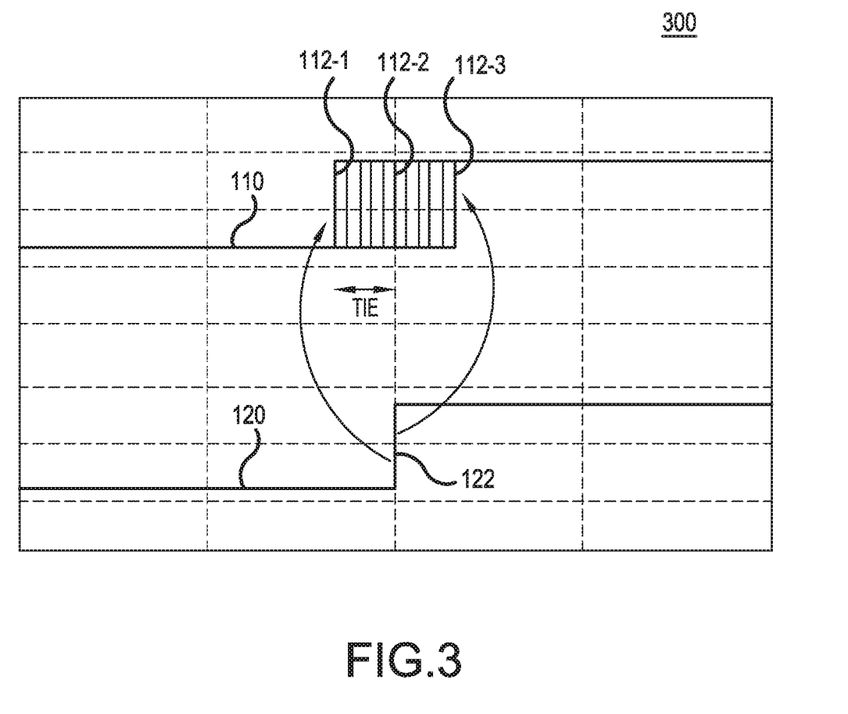
FIG. 3 illustrates an even higher time-resolution display of the portion of the signal waveform and the clock waveform of FIG. 1, showing more clearly the PSIJ on the signal waveform.

FIG. 3 illustrates an even higher time-resolution display 300 of the portion of signal waveform 110 and clock waveform 120, illustrating more clearly the jitter on signal waveform 110. Here, it can be seen that in general there is a wide range of time for actual bit transitions 112-1, 112-2, 112-3 . . . which occur for rising edge 122 of clock waveform 120. The difference between the actual time when the measurement instrument observes a bit transition (e.g., 112-1) in a victim signal from captured samples of the victim signal, and the time of an associated edge (e.g., 122) of the recovered clock, is referred to herein as a time interval error (TIE).

Figure 4:
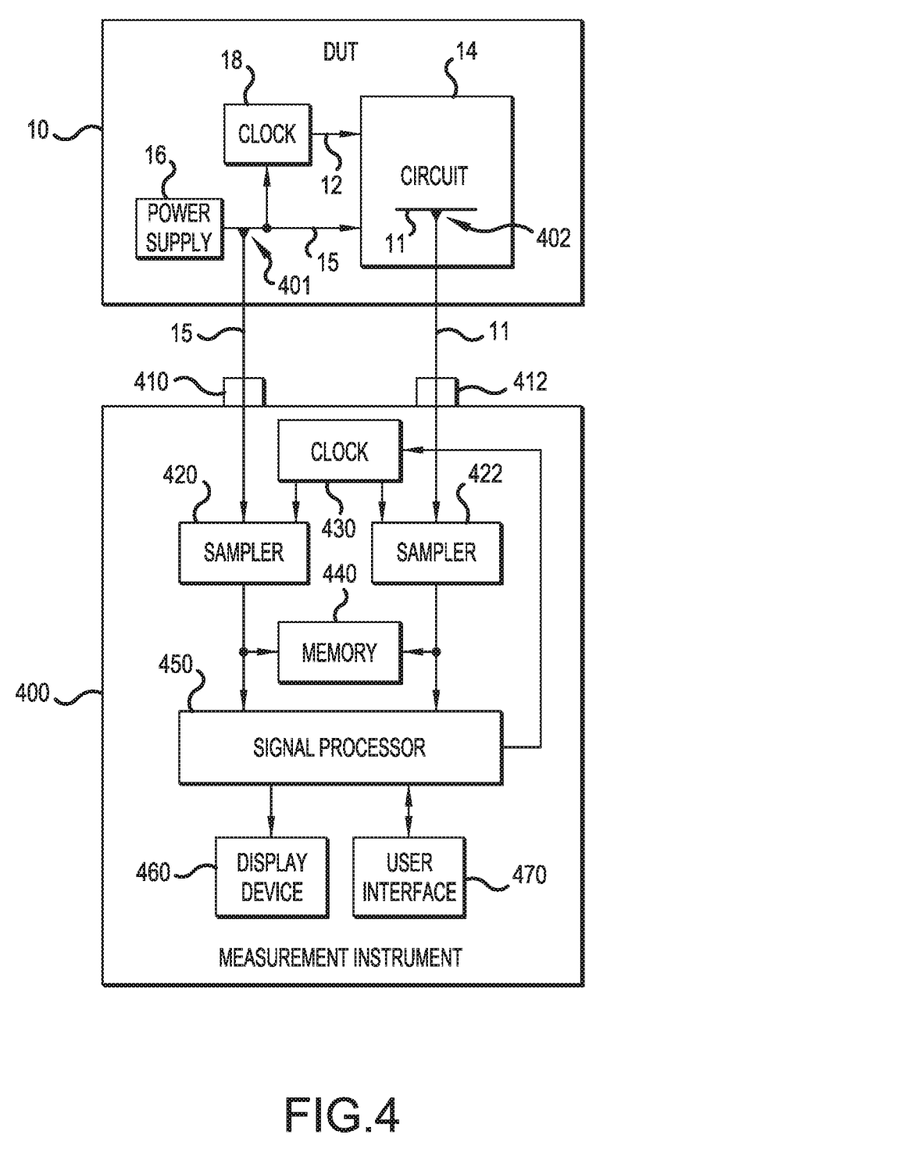
FIG. 4 is a simplified block diagram of an example embodiment of a measurement instrument which may analyze PSIJ on a signal of a device under test.

FIG. 4 is a simplified block diagram of an example embodiment of a measurement instrument 400 which may analyze PSIJ on a victim signal 11 of an example device under test (DUT) 10.

Here, example DUT 10 includes a circuit 14, for example a high speed digital communication circuit, at least one power supply 16, and at least one clock 18. Circuit 14 is powered by one or more supply voltages, including at least one supply voltage 15 produced by power supply 16. Circuit 14 also receives a clock signal 12 from clock 18 and may use clock signal 12 to control the timing of edges or bit transitions in one of more signals of circuit 14.

In DUT 10, a victim signal 11 of circuit 14 experiences power supply crosstalk of supply voltage 15. In some embodiments of DUT 10, as discussed above, power supply crosstalk may affect both the amplitude of the waveform of victim signal 11 and may also affect the timing of edges or bit transitions in victim signal 11 via PSIJ. Such PSIJ may occur, for example, when power supply 16 provides supply voltage 15 to an oscillator (e.g., voltage controlled oscillator (VCO) and/or a phase-locked loop (PLL) in clock 18 which is used to generate clock signal 12.

In some embodiments, measurement instrument 400 may be a digital oscilloscope.

Measurement instrument 400 may include: a first input 410 configured to receive (e.g., via a first probe 401) supply voltage 15 from a DUT 10; a first sampler 420 configured to capture samples of the received supply voltage; a second input 412 configured to receive (e.g., via a second probe 402) victim signal 11 from DUT 10; a second sampler 422 configured to capture samples of received victim signal 11; and a signal processor 450.

In some embodiments, each of first sampler 420 and second sampler 422 may include an analog-to-digital converter (ADC) which may be clocked in response to a clock 430 of measurement instrument. In some embodiments, clock 430 may be recovered from the captured samples of received victim signal 11 by any of many clock recovery techniques known to those skilled in the art.

Measurement instrument 400 may include a display device 460 and a user interface 470. Display device 460 may include a liquid crystal display (LCD), a plasma display, a cathode ray tube (CRT), etc. User interface 470 may include one or more of: a keyboard, a keypad, control knobs, a mouse, a trackball, buttons, indicator lights, etc., and associated processor and software for implementing user interface 470.

Measurement instrument 400 may include memory 440 which may store therein digitized samples of victim signal 11 captured by first sampler 420 and digitized samples of supply voltage 15 captured by second sampler 422. In that case, in some embodiments the digitized samples may be communicated by measurement instrument 400 under control of a controller or processor (not shown) via a communications interface (also not shown) to an external device such as a computer where the digitized samples may be processed as described below with respect to signal processor 450. The communication interface may be any suitable interface, for example conforming to standards such as Ethernet, specialized test instrument standards, etc. In some embodiments, the communication interface may allow measurement instrument to communicate commands and data with one or more external computers and/or other measurement instruments via the Internet.

Measurement instrument 400 may include other components and subsystems not illustrated in FIG. 4 so as not to obscure features of measurement instrument described herein for estimating jitter induced on received victim signal 11 from received supply voltage 15.

Measurement instrument 400 may estimate the PSIJ on victim signal 11 using a predetermined model implemented by signal processor 450 for determining the jitter induced onto received victim signal from the supply voltage. The predetermined model may represent the jitter as a function of the received victim signal and a plurality of unknown parameters. Signal processor 450 may process the captured samples of received victim signal 11 and received supply voltage 15 to determine or ascertain a plurality of unknown parameters of the predetermined model which apply to the particular received victim signal 11 and the particular received supply voltage 15. Signal processor 450 may then apply the predetermined model with the parameters as determined above to received victim signal 11 and received supply voltage 15 to estimate the crosstalk induced jitter on received victim signal 11 from received supply voltage 15. In some embodiments, signal processor 450 may then remove the estimated jitter from the received victim signal 11. In some embodiments, measurement instrument 400 may then display to a user a signal waveform for the victim signal with the jitter removed.

In some embodiments, signal processor 450 may determine or ascertain the parameters of the predetermined model for estimating jitter induced on victim signal 11 from supply voltage 15 from only a single set of simultaneously performed measurements or acquisitions of victim signal 11 and supply voltage 15.

Further details of embodiments of a procedure described above for analyzing power supply induced jitter on victim signal 11 will now be described in connection with signal processor 450 and measurement instrument 400. However, as noted above, in some alternative embodiments, some or all of the operations mentioned above and described in greater detail below may be performed "offline" on previously-captured samples of received victim signal 11 and received supply voltage 15 that have been stored in memory, so long as the data for the received victim signal 11 and the received supply voltage 15 were captured or generated to be in sync with each other. In still other embodiments, some or all of these operations may be performed on data for a victim signal which was generated from a simulation of the device under test.

Beneficially, the predetermined model described above separates jitter on victim signal 11 into two components: (1) a component caused by intersymbol interference (ISI) in victim signal 11, itself; and (2) the component that is desired to be ascertained or determined which is caused by crosstalk interference from supply voltage 15. ISI can be generated from many things, in particular as a result of finite bandwidth in the transmission channel for victim signal 11 and from reflections at critical points in the transmission channel, but by definition all of these things are correlated with the data in victim signal 11, itself. In contrast, interference from supply voltage is generally uncorrelated with the data in victim signal 11, and advantage is taken of this fact to facilitate separation of the ISI from the crosstalk interference from supply voltage 15.

Beneficially, signal processor 450 may perform a series of pre-processing operations, including edge detection in the waveform for victim signak 11, clock recovery from the waveform for victim signal 11, and jitter analysis of the waveform for victim signal 11, which may include determining or ascertaining time interval error (TIE) values or data for a plurality of bit transitions 112 in signal waveform 110 of victim signal 11. In some embodiments, signal processor 450 may ascertain time interval error (TIE) data for received victim signal 11 from the captured samples of received victim signal 11 and from recovered clock 430. Here, the TIE data represents for each bit transition 112 in received victim signal 11 a difference between: (1) a time when measurement instrument 400 observes bit transition 112 occurring in received victim signal 11 from the captured samples of received victim signal 11, and (2) a time of an associated edge 122 of recovered clock 430.

Beneficially, measurement instrument 400 may have incorporated therein the ability to employ standard methods for performing these pre-processing operations, and any of these standard methods may be employed. For example, measurement instrument 400 may allow a user (e.g., via user interface 470) to specify voltage thresholds for defining the timing of an edge of bit transition 112. Measurement instrument 400 also may allow a user (e.g., via user interface 470) to specify one of many built-in clock recovery algorithms to be applied to victim signal 11 to recover clock 430. Beneficially, however, clock recovery algorithms which are adaptive and which may filter out low-frequency jitter (e.g., phase lock loop clock recovery algorithms) should be avoided, as they may eliminate low frequency jitter which may be produced by crosstalk from supply voltage 15, thus preventing analysis of such jitter.

Beneficially, signal processor 450 may perform a de-skewing pre-processing operation to eliminate or compensate for small time shifts or skew between supply voltage 15 and victim signal 11. Further description of an example of such a de-skewing algorithm will be described in greater detail later.

Assuming any pre-processing operations described above are performed, an initial operation may be to apply the captured samples of the received supply voltage 15 and the captured samples of the received victim signal 11 to the predetermined model which represents the jitter induced onto received victim signal 11 from supply voltage 15, to produce a system of equations which can be solved to determine or ascertain the unknown parameters of the predetermined model. Beneficially, the predetermined model is a model of TIE data for received victim signal 11 as a function of: (1) ISI in received victim signal 11, and (2) the jitter induced onto received victim signal 11 from received supply voltage 15.

Beneficially, the model of the TIE data for received victim signal 11 includes a sum of: (1) an ISI filter function $h_v$ applied to bit transitions in received victim signal 11; (2) a crosstalk filter function $h_a$ applied to the captured samples of received supply voltage 15; and (3) a constant. Beneficially, solving the system of equations for the predetermined model may comprise first determining or ascertaining the ISI component of the interference on victim signal 11, and then determining or ascertaining the jitter induced onto received victim signal 11 from received supply voltage 15 by removing the ISI component from the TIE data. In some embodiments, determining or ascertaining the ISI component of the interference on received victim signal 11 may comprise: (1) ascertaining, from bit transitions 112 in received victim signal 11 for a plurality of instances of a repeating pattern included in received victim signal 11, an average vector of average TIE values over the plurality of instances of the data pattern for each bit transition 112 in the data pattern; and (2) ascertaining from the average vector and the bit transitions 112 in the repeating data pattern the coefficients of the ISI filter function $h_v$. In other embodiments, determining or ascertaining the ISI component of the interference on received victim signal 11 may comprise ascertaining the coefficients of the ISI filter function $h_v$ by solving a set of linear equations wherein the TIE data is set equal to a convolution of the ISI filter function $h_v$ and the bit transitions 112 in received victim signal 11. Further details of both approaches will be described below.

Once the unknown parameters of the predetermined model are determined or ascertained, signal processor 450 may then apply the predetermined model with the parameters to received victim signal 11 and received supply voltage 15 to estimate the crosstalk induced jitter on received victim signal 11 from received supply voltage 15. In some embodiments, signal processor 450 may then remove the estimated jitter from the received victim signal 11. In some embodiments, measurement instrument 400 may then display to a user a signal waveform for the victim signal with the jitter removed.

Further details will now be described regarding embodiments of the predetermined model which represents the jitter induced onto received victim signal from the supply voltage waveform.

As mentioned above, a supply voltage may inject timing distortion of uncertainty (jitter) directly onto victim signal 11 by causing perturbations in the phase or frequency clock signal 12 which may be used to establish the timing of bit transitions 112 in victim signal 11.

Here, we are interested in variations in timing in the edges or bit transitions 112 of victim signal 11, and not in signal waveform 110, itself. Accordingly, the predetermined model beneficially may represent how the timing of edges or bit transitions 112 is changed as a result of crosstalk from supply voltage 15.

As noted above, TIE data provides one representation of the actual timing of edges or bit transitions 112 with respect to their ideal timing. The ideal timing can be determined from a clock, such as recovered clock 430, or a fixed, explicit, clock which may be input to the algorithm which generates the TIE data. More specifically, the TIE data represents for each bit transition 112 in received victim signal 11 a difference between: (1) the time when measurement instrument 400 observes bit transition 112 occurring in received victim signal 11 from the captured samples of received victim signal 11, and (2) the expected time of bit transition 112 as defined by the time of an associated edge 122 of an the clock.

As explained above, the TIE data for received victim signal 11 can be affected by both ISI and by crosstalk interference from supply voltage 15.

One example of a continuous model for timing errors on victim signal 11, before data are sampled by the Measurement instrument 400, as a function of both ISI and by crosstalk interference from supply voltage 15 is:

$$\dot{T}_v = \int \dot{h}_v(\tau)\dot{E}_v(t-\tau)d\tau + \int \dot{h}_a(\tau)(\dot{M}_A(t-\tau)-k_a)d\tau+k_v, \quad (1)$$

where $\dot{T}_v$ is the continuous timing error for received victim signal 11; $\dot{h}_v$ is a continuous ISI filter function; $\dot{h}_a$ is a continuous crosstalk filter function; $\dot{E}_v$ is an "edge function" which represents edges or bit transitions 112 in received victim signal 11; $\dot{M}_A$ is the supply voltage 15; $k_a$ is a constant which represents the DC component of supply voltage 15; and $k_v$ is a constant which represents a DC component in the timing error data. The integral operators represent convolution.

Noting that the convolution with a constant produces another constant, equation (1) can be rewritten as:

$$\dot{T}_v = \int \dot{h}_v(\tau)\dot{E}_v(t-\tau)d\tau + \int \dot{h}_a(\tau)\dot{M}_A(t-\tau)d\tau + k, \quad (2)$$

where k is a constant.

The parameters in the model in equation (2) are continuous functions, which can be sampled by the Measurement Instrument 400. Thus we need to convert equation (2) to a discrete version that is based on samples of the received victim signal 11, the computed TIE data, and supply voltage 15. The discrete version of the convolution operator requires samples to have the same sampling rate, and be equally-spaced. However, the TIE data and the supply voltage sample data have different sample rates, with the TIE data set being substantially smaller, having only one data sample for each edge or bit transition 112 in the waveform for victim signal 11.

Second, the TIE data samples are not equally spaced as in general there is not an edge or bit transition for every bit in victim signal 11 (i.e., victim signal 11 may have two or three consecutive bits of the same value before there is an edge or bit transition 112—see FIG. 1). And indeed, even if there was an edge or bit transition 112 for every bit, as noted above the TIE data is defined with respect to the timing of corresponding edges in the clock, and the edges in the clock do not have to be equally spaced.

Beneficially, in some embodiments signal processor 450 may employ interpolation to address these issues.

In some embodiments, the interpolation may include constructing an equally-spaced grid of one sample of supply voltage 15 for each bit in received victim signal 11. Then, the TIE data may be upsampled to that grid, and the captured samples of the received supply voltage 15 may be downsampled to that grid. Many interpolation algorithms for performing the upsampling and downsampling are known to those skilled in the art and may be employed here.

Given this interpolation, equation (2) may be rewritten as:

$$T_v^e = h_v * E_v + h_a * M_A^e + k, \quad (3)$$

where $T_v^e$ and $M_A^e$ are interpolated versions of the TIE data, and the captured samples of the received supply voltage, respectively, onto the grid of one sample per bit.

The model of equation (3) represents a discrete convolution of the ISI filter function $h_v$ and crosstalk filter function $h_a$ with the vector which represents edges or bit transitions 112 in received victim signal 11 and interpolated captured samples of the received supply voltage 15.

As noted above, the edge vector $E_v$ represents edges or bit transitions 112 in received victim signal 11. In some embodiments, $E_v$ may be assigned: a value of 1 for samples of received victim signal 11 at rising edges or positive bit transitions 112, a value of −1 for samples of received victim signal 11 at falling edges or negative bit transitions 112, and 0 for all other samples. However other representations are possible and envisioned, so long as they generate a vector which represents or is correlated to edges or bit transitions 112 in received victim signal 11.

The lengths and number of taps of ISI filter function $h_v$ and crosstalk filter function $h_a$ may be selected to be any appropriate values. Beneficially, the filter formats for ISI filter function $h_v$ and crosstalk filter function $h_a$ may include equally-spaced digital filters defined over a time span or using a defined number of taps, or filter taps that are sub-sampled on equally-spaced, or non-equally spaced grid, or filter taps that are averaged together, or any other commonly employed representation. In some embodiments, the configurations or formats of ISI filter function $h_v$ and crosstalk filter function $h_a$ may be specified by a user or may be determined automatically by measurement instrument 400.

In some embodiments, ISI filter function $h_v$ and crosstalk filter function $h_a$ may be linear filters with a defined number of taps and define tap spacings and having unknown or unspecified coefficients, where the unknown coefficients may be the unknown parameters of the predetermined model which represents the jitter induced onto the received victim signal from the supply voltage (and from ISI). In some embodiments, ISI filter function $h_v$ may be defined to have 33 equally-spaced taps, and crosstalk filter function $h_a$ may be defined to have 65 equally-spaced taps. In that case, the unknown parameters for the model which are to be determined by signal processor 450 for a particular supply voltage 15 and received victim signal 11 may include a total of 98 coefficients for the filter taps.

Further details will now be described regarding embodiments of procedures for determining or ascertaining the unknown parameters (e.g., filter function coefficients) of a predetermined model which represents the jitter induced onto the received victim signal from the supply voltage, where the predetermined model is represented by equation (3).

Equation (3) represents a linear system of equations. In terms of linear algebra, a linear system of equations is represented by a matrix equation, where each row of the matrix equation represents one equation and each column represents one unknown.

Solving equation (3) involves an application of linear algebra. Unlike normal algebra, in linear algebra one has to solve a system of several equations all at once, and that means that an exact solution is almost always impossible to obtain. So a matrix equation such as A*x=c, where x is an unknown array of numbers, is generally not treated as an equality but as an ideal or a model. It represents a set of constraints that are being imposed, which may or may not be reasonable. For example, in the case of equation (3), in general there are many more equations than there are unknowns, so it is in general not possible to find a specific set of values for the unknown parameters that will be make all of those equations true. Instead, in some embodiments signal processor 450 may find the values for the unknown parameters which minimize the least-square error for the equations. In that case, we can say that signal processor 450 computes an estimated set of values for the unknown parameters which makes the equations approximately true. In other embodiments signal processor 450 may select a different approximation rather than a least-square error, such as one that will minimize the maximum error among the equations, which in general would lead to different values for the unknown parameters.

For the linear system of equation (3), there is one equation for each TIE data point in the vector $T_v^e$ and for each bit in received victim signal 11. However, not all of these equations are equally valid. As described above, for the bits where there is no edge or bit transition 112, the accuracy or validity of the TIE data may be reduced since the TIE values are obtained by interpolating from neighboring edges or bit transitions 112, some of which may be far away in time. Furthermore, the edge vector $E_v$ only has non-zero values where there is an actual edge or bit transition 112.

Furthermore, in general, the number of equations obtained by expanding the matrix equation (3) may be much greater than the number of unknown parameters (e.g., filter coefficients) to be solved for—especially if the number of samples of received victim signal 11 and supply voltage 15 which are captured spans a large number of edges or bit transitions 112.

Accordingly, in some embodiments those equations which do not correspond to a bit of received victim signal 11 which has an edge or bit transition 112 are discarded to improve the accuracy of the solution. In terms of the matrix equation, this corresponds to subsampling the matrix by eliminating any rows whose bits do not correspond to an edge or bit transition 112.

Equation (3) may now be solved for the unknown parameters (e.g., unknown coefficients) of the ISI filter function $h_v$ and crosstalk filter function $h_a$.

In some embodiments, equation (3) may be solved by first determining or ascertaining the unknown parameters or coefficients of ISI filter function $h_v$. In some cases, this may be more efficient or accurate than solving for all of the unknowns of the ISI filter function $h_v$ and crosstalk filter function $h_a$ together.

In some embodiments, victim signal 11 may be periodic or may include a repeating pattern, such as a pseudo random bitstream (PRBS). In some cases, DUT 10 may have an internal function, which may be selected by a user, to cause victim signal 11 to have the repeating pattern. In some cases, DUT 10 may have an input to receive a signal which includes a repeating pattern or PRBS and may generate victim signal 11 therefrom also to have a repeating pattern.

In case victim signal 11 is periodic or includes a repeating pattern, then the TIE data may be divided into sections which are each one pattern long, and all of those sections may be averaged together. The averaging operation averages out any components of the TIE data which are uncorrelated with the pattern, including noise and crosstalk. The result of the averaging is an average TIE vector, $A_v$, having one data value for each bit in the pattern, and is equal to the ISI term of equation (3) according to equation (4):

$$A_v = h_v * E_v \quad (4)$$

The average TIE vector, $A_v$, is equal to the ISI component of the model of equation (3).

Thus, in some embodiments, signal processor 450 may determine or ascertain the unknown parameters of the ISI filter function by: (1) ascertaining, from bit transitions 112 in received victim signal 11 for a plurality of instances of a repeating pattern included in received victim signal 11, an average vector of average TIE values over the plurality of instances of the data pattern for each bit transition 112 in the data pattern; and (2) ascertaining from the average vector and the bit transitions 112 in the repeating data pattern the coefficients of the ISI filter function $h_v$.

This approach may be much faster than solving a series of linear equations. It may also be more accurate, as since using long data patterns is more stable numerically than using long filters as a means for discovering how a particular reflection interferes with all of the other bits downstream.

In other embodiments, determining or ascertaining the ISI component of the interference on received victim signal 11 may comprise ascertaining the coefficients of the ISI filter function $h_v$ by solving a set of linear equations wherein the TIE data is set equal to a convolution of the ISI filter function $h_v$ and the bit transitions 112 in received victim signal 11 according to equation (5):

$$T_v^e \cong h_v * E_v \quad (5)$$

Equation (5) forces the ISI filter function $h_v$ to only represent interference which is correlated with the edges or bit transitions 112, as represented by the edge vector $E_v$. Once signal processor 450 determines the ISI filter function $h_v$, then it may determine from equation (4) the ISI component $A_v$ of the model of equation (3).

By separating the construction of the ISI filter function $h_v$ and the crosstalk filter function $h_a$, filters may be produced which better separate the ISI and crosstalk interference. Solving for both at the same time, as in solving equation (3) directly, may allow the ISI filter function $h_v$ to represent some of the crosstalk and the crosstalk filter function $h_a$ to represent some of the ISI since the ISI and the crosstalk are not perfectly orthogonal to each other (even though they are largely uncorrelated with each other). Furthermore, the memory requirements for signal processor 450 with this approach may be reduced as the separate matrices for the ISI and the crosstalk may be half as big as a single matrix for both.

Once signal processor 450 has determined $A_v$, then it may be subtracted off from the model of equation (3) to produce an interpolated versions of the TIE data with the ISI-removed $T_a^e$, according to equation (6):

$$T_a^e = T_v^e - A_v \quad (6)$$

Then, equation (3) may be rewritten as:

$$T_a^e = h_a * M_a^e \quad (7)$$

As mentioned earlier, linear systems such as equations (5) and (7) may be written as a matrix equation, with each row of the matrix being a single equation, and each column corresponding to one unknown parameter (e.g., filter coefficient). The total number of equations M is only limited by the number of data samples which are acquired by measurement instrument 400. So in general the number of equations M>>N, where N is the number of unknown parameters which are to be determined or ascertained.

In some embodiments, signal processor 450 may pre-multiply the linear system with its transpose to create what are referred to as the Normal equations, a matrix of size N×N. In that case, signal processor may apply any of a number of direct solvers, such as LU decomposition, QR factorization, the pseudo-inverse, etc. to the matrix to determine the unknown parameters. Iterative techniques such as Gauss-Seidel, or the Conjugate Gradient method may also be employed. In other embodiments, one of these techniques, or another technique, may operate directly on the original linear system without forming the Normal equations, since forming the Normal equations may greatly reduce accuracy.

In some embodiments, signal processor 450 may employ a direct solver to obtain initial estimates of the values of the unknown parameters, and then as more data is processed may employ an iterative solver to update the estimates.

In some embodiments, signal processor 450 may employ a solver which is customized or tailored to the particular format of crosstalk filter function $h_a$. For example, if crosstalk filter function $h_a$ has taps tightly clustered in the center of the filter, then signal processor 450 may employ a direct solver on just those clustered taps to obtain initial estimates of the values of the unknown parameters, and then as more data is processed may employ an iterative solver on all taps of the filter functions to update the estimates.

Once signal processor 450 has determined the estimated parameters or coefficients of crosstalk filter function $\hat{h}_a$, it may convolve the estimated crosstalk filter function $\hat{h}_a$ with the interpolated version of the captured samples of supply voltage 15, $M_a^e$, to obtain the magnitude of the power supply induced jitter $T_x^e$:

$$T_x^e = \hat{h}_a * M_a^e \tag{8}$$

Further details will now be described regarding embodiments of procedures for removing from received victim signal 11 the estimated jitter induced thereon from supply voltage 15.

First, we recall that the time base of $T_x^e$ is the equally-spaced clock which was described previously and which has one sample per data bit of received victim signal 11. However, it is desired to subtract the PSIJ from a waveform 110 for received victim signal 11 which has a plurality of samples per bit. To address this, in some embodiments signal processor 450 may perform the following three operations. (1) Signal processor 450 may the upsample $T_x^e$ to a sample rate which is identical to that of waveform 110, producing $T_x^u$. In some embodiments, this may be accomplished by interpolation, for example via linear interpolation (although other interpolation algorithms are possible and contemplated). (2) Signal processor 450 may correct the timebase of waveform 110 of received victim signal 11 to remove the jitter. In particular, each sample of victim signal 11 was captured at some moment in time t, and in order to move the waveform in time signal processor 450 changes the time vector of waveform 110 of received victim signal 11. The time vector t' which removes the PSIJ may be found from:

$$t' = t - T_x^u \tag{9}$$

(3) Signal processor 450 may return waveform 110 of received victim signal 11 to an equally spaced grid. That is, the new time vector t' which was produced in the previous operation represents the locations in time where the captured samples of received victim signal 11 should be located in order to remove PSIJ. The modified waveform with these time-shifted samples consists of a collection of time/value pairs (t', My), where M are the captured samples of received victim signal 11. However, these samples M are no longer equally spaced in time. It is often desirable to provide an output waveform which is defined on an equally-spaced time grid, for example for display on an oscilloscope. To return the samples to an equally spaced grid, signal processor 450 may interpolate the modified waveform at the original grid of time vector t. Since the captured samples may be dense, in some embodiments signal processor 450 may employ a higher order interpolation algorithm. In other embodiments, signal processor 450 may employ linear interpolation.

When interpolation is employed, the final data set or waveform will be slightly smaller than the original. Also, since convolution produces data which is invalid at the edges, care should be taken to perform interpolations on data that is inside the invalid data on the edges. Extrapolation may be employed to recover data at the edges, with possible losses of accuracy.

As noted above, in some embodiments signal processor may perform a de-skewing operation to synchronize the crosstalk caused by supply voltage 15 with the crosstalk experienced by received victim signal 11. In some embodiments, signal processor may perform this de-skewing as follows.

First, signal processor 450 upsamples (interpolates) the TIE data for received victim signal 11 to produce one sample for each bit in received victim signal 11 (even if there is no edge or bit transition 112 for a given bit).

Next, signal processor 450 calculates an average-removed waveform for the upsampled TIE data, which is $T_a^e$ defined in equation (6).

Meanwhile, signal processor 450 downsamples the captured samples of supply voltage 15 to also produce one sample per bit in received victim signal 11, which is $M_A^e$. Thus the waveform of sample voltage and the average-removed waveform, $T_a^e$, for the upsampled TIE data are placed on a common time spacing or grid.

Next, signal processor 450 performs a cross-correlation on the average removed waveform $T_a^e$ and the downsampled waveform for supply voltage 15 $M_A^e$, and determines the location of the maximum of the absolute value of the cross-correlation result. Signal processor defines a sample skew as the number of samples in the grid between the location of the maximum of the absolute value of the cross-correlation result and the center of the grid. Signal processor 450 may convert the sample skew in the cross-correlation result to a time skew by multiplying the number of samples in the sample skew by the spacing of the samples in time on the common grid. Signal processor 450 may convert the time skew to a sample skew in supply voltage 15 by dividing the time skew by the original sample interval for supply voltage 15. Meanwhile, signal processor 450 may use the time skew to define a shift in the time base of the TIE data.

Figure 5:
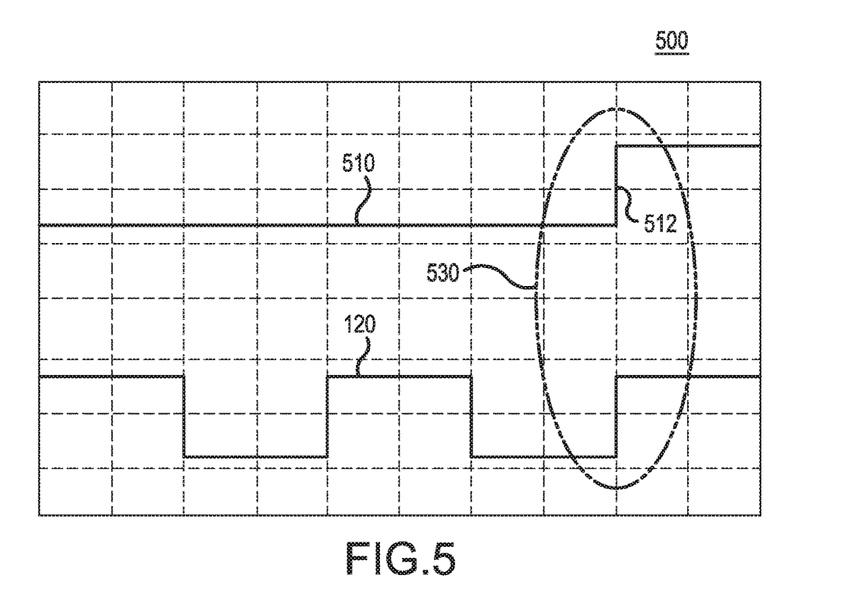
FIG. 5 illustrates a display of a portion of the signal waveform and the clock waveform of FIG. 2 where the PSIJ has been removed from the displayed signal waveform.

FIG. 5 illustrates a display 500 of a portion of signal waveform 510 which corresponds to the portion of signal waveform 110 of FIG. 2, with the power supply induced jitter removed as described above. Here it is seen that the timing of the edge or bit transition 512 in signal waveform is relatively constant from one pattern to another.

Figure 6:
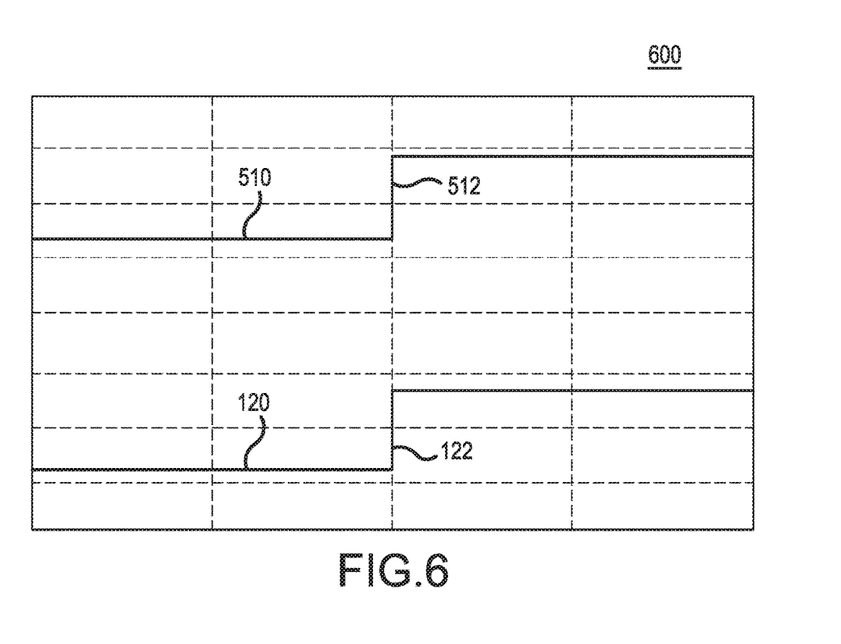
FIG. 6 illustrates an even higher time-resolution display of the portion of the signal waveform and the clock waveform of FIG. 5, showing more clearly the removal of PSIJ from the displayed signal waveform.

FIG. 6 illustrates an even higher time-resolution display 600 of displayed signal waveform 510, showing more clearly how the PSIJ has been removed. In particular, FIG. 6 illustrates a portion 530 of display 500 where again it is seen that the timing of edge of bit transition 512 has had power supply induced jitter removed.

Although the edge or bit transition 512 in victim waveform is shown in FIGS. 5 and 6 as being simultaneous with the rising edge of clock waveform 120, in general there may be some fixed delay between the rising edge of clock waveform 120 and the timing of edge or bit transition 512. Furthermore, although in FIGS. 5 and 5 it appears that there is no jitter at all in signal waveform 510, in general there still may be some residual jitter in signal waveform 510, due to ISI within signal waveform 510 or from other factors, even after PSIH is removed.

Summarizing an example of the procedures described above, FIG. 7 is a flowchart of an example embodiment of a method 700 of analyzing PSIJ for a victim signal of a device under test which may be performed in whole or in part by measurement instrument 400. Many possibilities for performing method 700 exist and are contemplated within the scope of this disclosure.

Figure 7:
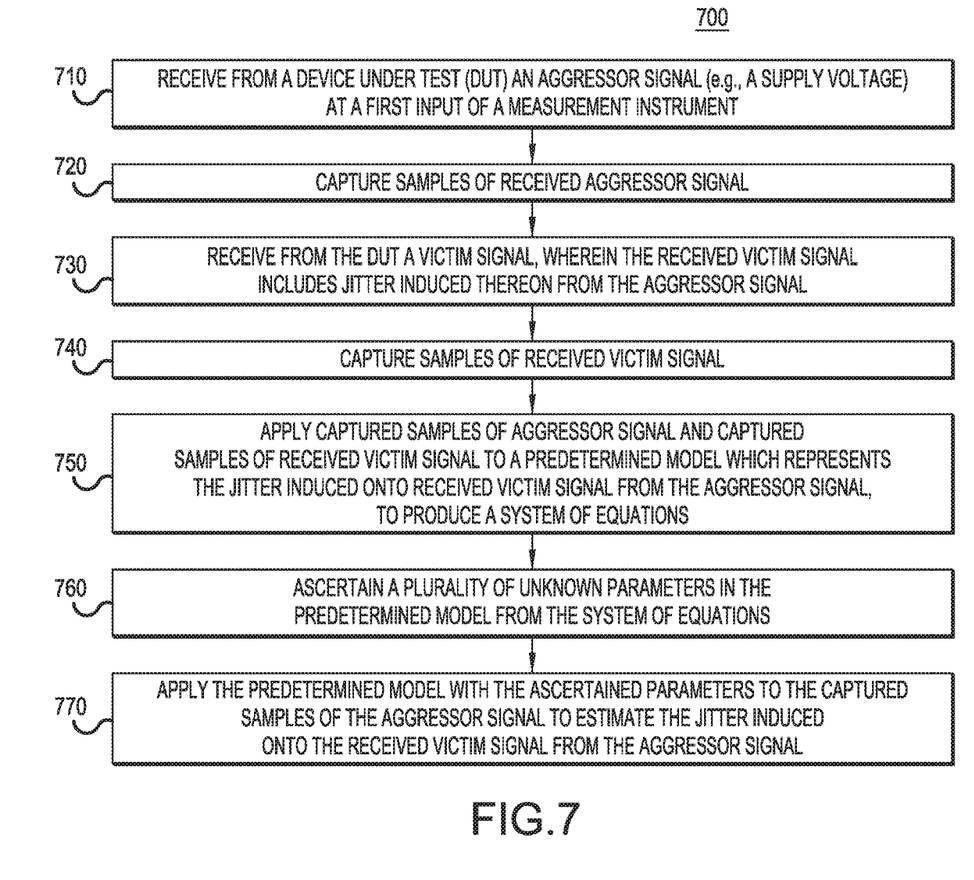
FIG. 7 is a flowchart of an example embodiment of a method of analyzing PSIJ for a victim signal of a device under test.

In an operation 710, measurement instrument 400 receives an aggressor signal (e.g., supply voltage 15) from device under test (DUT) 10 at first input 410.

In an operation 720, measurement instrument 400 captures samples of received supply voltage 15.

In an operation 730, measurement instrument 400 receives victim signal 11 from DUT 10 at second input 412, wherein the received victim signal includes jitter induced thereon from the aggressor signal (e.g., supply voltage 15).

In an operation 740, measurement instrument 400 captures samples of received victim signal 11.

In an operation 750, measurement instrument 400 applies the captured samples of the aggressor signal (e.g., supply voltage 15) and the captured samples of received victim signal 11 to a predetermined model which represents the jitter induced onto received victim signal 11 from the aggressor signal, to produce a system of equations.

In an operation 760, measurement instrument 400 ascertains a plurality of unknown parameters in the predetermined model from the system of equations.

In an operation 770, measurement instrument 400 applies the predetermined model with the ascertained parameters to the captured samples of the aggressor signal to estimate the jitter induced onto received victim signal 11 from the aggressor signal.

While example embodiments are disclosed herein, one of ordinary skill in the art appreciates that many variations that are in accordance with the present teachings are possible and remain within the scope of the appended claims. For example, in some cases a measurement instrument may receive and process more than aggressor signal and/or more than one victim signal. In that case, the procedures described herein can be performed with respect to each combination of a particular aggressor signal and a particular victim signal to estimate the jitter which is induced onto the particular victim signal from the particular aggressor signal. The invention therefore is not to be restricted except within the scope of the appended claims.

The invention claimed is:

1. A method, comprising:
    a measurement instrument receiving at a first input thereof an aggressor signal from a device under test (DUT);
    the measurement instrument capturing samples of the received aggressor signal;
    the measurement instrument receiving at a second input thereof a victim signal from the DUT, wherein the received victim signal includes jitter induced thereon from the aggressor signal;
    the measurement instrument capturing samples of the received victim signal;
    applying the captured samples of the received aggressor signal and the captured samples of the received victim signal to a predetermined model, which represents the jitter induced onto the received victim signal from the aggressor signal, to produce a system of equations;
    ascertaining a plurality of unknown parameters in the predetermined model from the system of equations comprises: ascertaining the coefficients of the ISI filter function; after ascertaining the coefficients of the ISI filter function, subsequently ascertaining the coefficients of the crosstalk filter function by applying the captured samples of the aggressor signal and the received victim signal to the predetermined model using the ascertained coefficients of the ISI filter function; recovering a clock for the received victim signal from the captured samples of the received victim signal; and ascertaining time interval error (TIE) data for the received victim signal from the captured samples of the received victim signal and from the recovered clock, where the TIE data represents for each of a plurality of bit transitions in the received victim signal a difference between: (1) a time when the bit transition is observed in the received victim signal from the captured samples of the received victim signal, and (2) a time of an associated edge of the recovered clock, wherein: the predetermined model is a model of TIE data for the victim signal as a function of: (1) intersymbol interference (ISI) in the received victim signal, and (2) the jitter induced onto the received victim signal from the aggressor signal; the model of TIE data for the victim signal includes a sum of: (1) an ISI filter function applied to the bit transitions in the received victim signal; (2) a crosstalk filter function applied to the captured samples of the aggressor signal; and (3) a constant; wherein the unknown parameters include coefficients in the ISI filler function and in the crosstalk filler function.

2. The method of claim 1, further comprising applying the predetermined model with the ascertained parameters to the captured samples of the aggressor signal to estimate the jitter induced onto the received victim signal from the aggressor signal.

3. The method of claim 2, further comprising:
    removing from the received victim signal the estimated jitter induced thereon from the aggressor signal; and
    displaying on a display device the received victim signal with the estimated jitter removed.

4. The method of claim 1, wherein the model of TIE data is represented by: $T_v^e = h_v * E_v + h_a * M_A^e + k$,
    where: $h_v$ is the ISI filter function; $h_a$ is the crosstalk filter function; $E_v$ is a vector which represents the bit transitions in the received victim signal; $T_v^e$ and $M_A^e$ are interpolated versions of the TIE data, and the captured samples of the aggressor signal, respectively, onto an equally spaced grid of one sample per bit; and k is a constant.

5. The method of claim 1, wherein the aggressor signal is a supply voltage of the DUT.

6. The method of claim 1, wherein ascertaining the coefficients of the crosstalk filter function by applying the captured samples of the aggressor signal and the received victim signal to the predetermined model using the ascertained coefficients of the ISI filter function includes:
    subtracting from the TIE data an ISI component comprising a convolution of the ISI filter function and the bit transitions in the received victim signal; and
    solving a linear system of equations of a form $T_a^e = h_a * M_A^e$ to determine $\hat{h}_a$, where $\hat{h}_a$ is an estimated crosstalk filter function, and where $T_a^e$ and $M_A^e$ are, respectively, interpolated versions of: a component of TIE data due to the jitter induced onto the received victim signal from the aggressor signal, and the captured samples of the aggressor signal, onto an equally spaced grid of one sample per bit.

7. The method of claim 6, further comprising estimating the jitter induced onto the received victim signal from the aggressor signal, including convolving the estimated crosstalk filter function with the captured samples of the aggressor signal.

8. The method of claim 6, further comprising:
estimating the jitter induced onto the received victim signal from the aggressor signal; removing from the received victim signal the estimated jitter induced thereon from the aggressor signal; and
displaying on a display device the received victim signal with the estimated jitter removed,
wherein removing from the received victim signal the estimated jitter includes:
  upsampling $T_x^e$ to a sample rate at which the measurement instrument captures the samples of the received victim signal, producing upsampled jitter error $T_x^u$, where $T_x^e = \hat{h}_a * M_a^e$;
  correcting a time base of the captured samples of the received victim signal to remove the upsampled jitter error $T_x^u$; and
  interpolating the time-base corrected captured samples of the received victim signal to produce time-base corrected captured samples at an original sample rate of the captured samples of the received victim signal.

9. The method of claim 1, further comprising eliminating a skew between the captured samples of the aggressor signal and the captured samples of the received victim signal before applying the captured samples of the aggressor signal and the captured samples of the received victim signal to the predetermined model.

10. A measurement instrument, comprising:
a first input configured to receive an aggressor signal from a device under test (DUT);
a first sampler configured to capture samples of the received aggressor signal;
a second input configured to receive a victim signal from the DUT, wherein the received victim signal includes jitter induced thereon from the aggressor signal;
a second sampler configured to capture samples of the received victim signal; and
a signal processor configured to:
  apply the captured samples of the received aggressor signal and the captured samples of the received victim signal to a predetermined model, which represents the jitter induced onto the received victim signal from the aggressor signal, to produce a system of equations; and
  ascertain a plurality of unknown parameters in the predetermined model from the system of equations;
wherein the measurement instrument is configured:
  to process the received victim signal to recover a clock for the received victim signal from the captured samples of the received victim signal; and to ascertain time interval error (TIE) data for the received victim signal from the captured samples of the received victim signal and from the recovered clock, where the TIE data represents for each bit transition in the received victim signal a difference between: (1) a time when the measurement instrument observes the bit transition in occurring the captured samples of the received victim signal, and (2) a time of an associated edge of the recovered clock, wherein: the predetermined model is a model of TIE data for the received victim signal as a function of: (1) intersymbol interference (ISI) in the received victim signal, and (2) the jitter induced onto the received victim signal from the aggressor signal; the model of TIE data for the received victim signal includes a sum of: (1) an ISI filter function applied to the bit transitions in the received victim signal; (2) a crosstalk filter function applied to the captured samples of the aggressor signal; and (3) a constant; and the signal processor is configured to ascertain the coefficients of the ISI filter function by solving a set of linear equations wherein the TIE data is set equal to a convolution of the ISI filter function and the bit transitions in the received victim signal.

11. The measurement instrument of claim 10, wherein the signal processor is further configured to apply the predetermined model with the ascertained parameters to the captured samples of the aggressor signal to estimate the jitter induced onto the received victim signal from the aggressor signal.

12. The measurement instrument of claim 11, further comprising a display device,
wherein the signal processor is further configured to remove from the received victim signal the estimated jitter induced thereon from the aggressor signal, to display via the display device the received victim signal with the estimated jitter removed.

13. The measurement instrument of claim 10, wherein the unknown parameters include coefficients in the ISI filter function and in the crosstalk filter function, and
wherein the signal processor is configured to ascertain the plurality of unknown parameters in the predetermined model from the system of equations by:
  first ascertaining the coefficients of the ISI filter function; and
  then ascertaining the coefficients of the crosstalk filter function by applying the captured samples of the aggressor signal and the received victim signal to the predetermined model using the ascertained coefficients of the ISI filter function.

* * * * *